United States Patent Office 2,712,165
Patented July 5, 1955

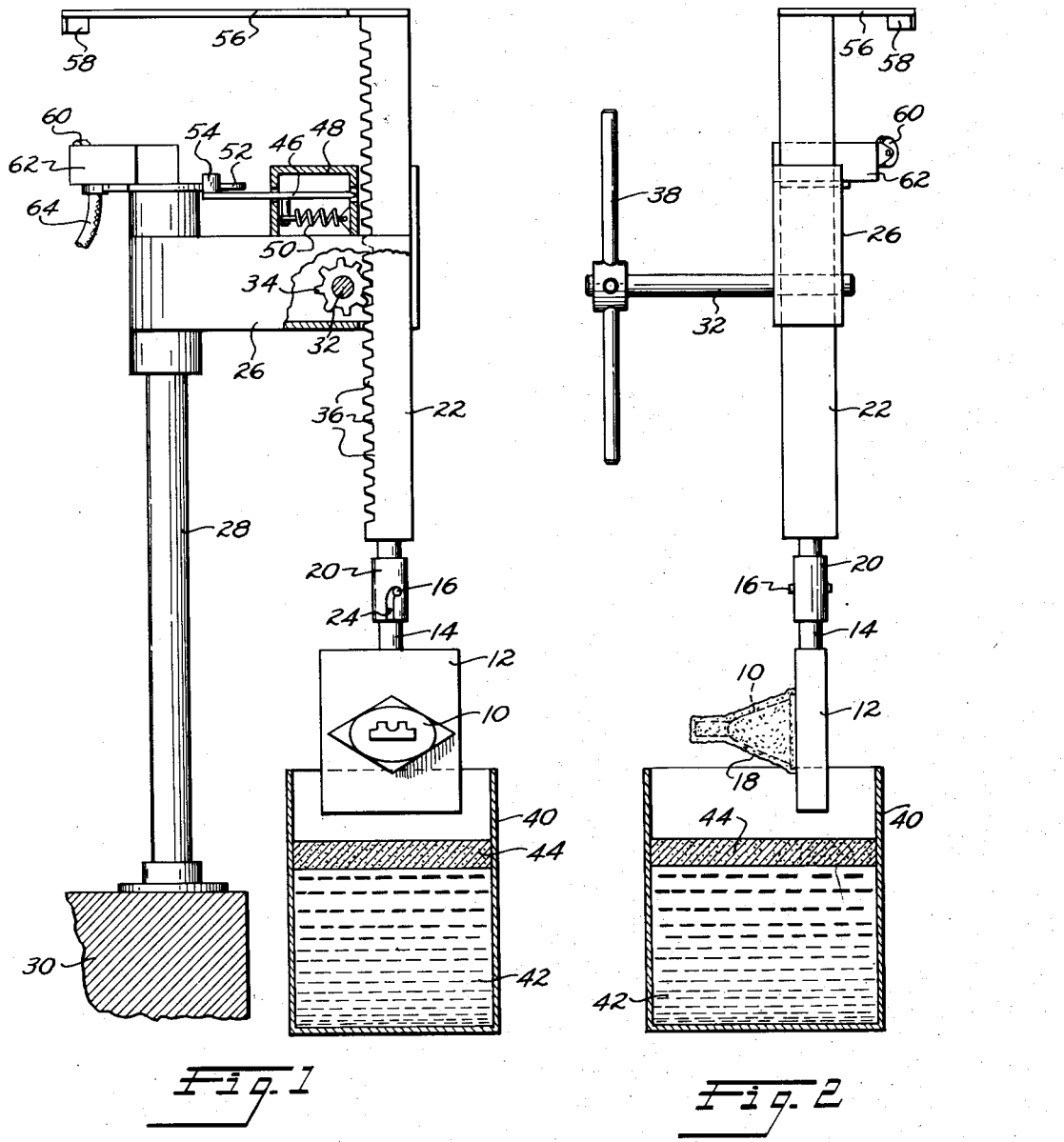
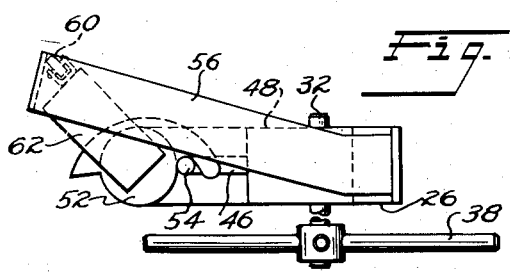
Fig. 1  Fig. 2  Fig. 3
July 5, 1955  W. H. DUNN ET AL  2,712,165
MOLD BAKING METHODS
Filed Nov. 28, 1951
INVENTORS
WALTER H. DUNN
CONRAD C. WISSMAN
BY Strauch, Nolan + Diggins
ATTORNEYS

2,712,165
MOLD BAKING METHODS

Walter H. Dunn, San Diego, and Conrad C. Wissman, Whittier, Calif., assignors to Solar Aircraft Company, San Diego, Calif., a corporation of California Application November 28, 1951, Serial No. 258,680

4 Claims. (Cl. 22—192)

This invention relates to improvements in molding, and has particular reference to methods and apparatus for making shell molds, cores and the like of plastics, with or without a filler.

Specifically, the invention provides a novel method and the apparatus for baking molds, cores and parts in a bath of molten metal or other liquid to produce a superior finished product.

The invention disclosed herein has particular utility in connection with the recently publicized "Croning" or "C" process for producing foundry molds and cores. However it may also be advantageously used in baking any kind of shell mold regardless of initial formation.

In the "C" process, the shell molding method comprises the steps of mixing a batch of sand, with or without a standard wetting agent, and a phenolic resin; loading it in a "dump bucket" or mold making machine; attaching a heated pattern to the face of the machine; inverting the machine to allow the batch to fall on the hot pattern thus causing a portion of the mix to form a shell over the pattern; removing the pattern with its shell to an oven; baking the pattern and shell for two or three minutes at a temperature of from 650° F. to 700° F.; and stripping the baked mold from the pattern. With ideally situated equipment, this process is completed in a minimum of five or six minutes.

It will be understood that the temperature of the pattern in the "C" process must be held at a definite predetermined point when it is brought in contact with the sand-resin mixture to insure that the correct amount of mixture will adhere to form a shell mold of proper thickness. Thus, the mold must be thin enough to retain sufficient permeability to allow for the escape of gases, and at the same time it must be thick enough to remain rigid during the casting process.

When the mold shell first congeals or forms on the pattern, prior to the baking process, it is in a "green" or "uncured" state and is susceptible to distortion by contact with foreign objects or by inadvertent jolting or sudden movement of the pattern. In this state the shell may also exhibit a slight "lay away" or peeling from portions of the pattern. This problem is one of the hazards or disadvantages of the "C" process and when it arises the present procedure is to attempt to manually refit the green shell more firmly on the pattern before baking it in the oven.

To overcome this problem our present invention provides a novel mold baking process which eliminates the necessity of manual refitting by automatically remedying any lay away or peeling in a far more positive and accurate manner than is possible by manual or other means. Our novel process eliminates oven baking altogether and substitutes therefor a molten metal bath, to be described, in which the pattern and its uncured shell is immersed and baked, the molten metal exerts a uniform pressure over the surface of the green shell and not only corrects any lay away from the pattern but produces a pressurized mold conforming in the minutest detail to the pattern.

While correction of lay away or peeling is a major advantage of our invention, another advantage of equal importance is that the metal bath cuts the time of the baking operation from the two or three minutes of current practice to less than a minute. In practice approximately forty seconds of baking has given excellent results. Thus, it will be apparent that not only is a considerable amount of time saved in eliminating the need for manual refitting but that much time is also saved in the baking operation itself. This faster overall operation results in saving many man-hours and considerable expense on any sizable mold making project.

Another important feature of our novel process is that the metal bath maintains the pattern at a correct predetermined temperature so that, after the baked mold is removed, the pattern may be used immediately to make another mold without the necessity of intermediate reheating. Other important advantages also accrue to the subject invention as will be pointed out hereinafter.

With the foregoing and other considerations in view, it is a prime object of this invention to provide a mold baking process which insures intimate contact at all points between the mold shell and the pattern during the baking process.

Another object of the invention is to provide a mold baking process which automatically corrects any lay away of the mold shell from the pattern while the shell is still in its green and comparatively flexible state at the immediate outset of said baking process.

A further object of our invention is to provide a mold baking bath which insures automatic removal of gas bubbles between the mold shell and the pattern and correction of any distortion of the shell caused by such bubbles.

Another object of the invention is to provide a mold baking bath in which the mold shell density can be controlled to insure the correct degree of permeability and rigidity in the finished mold.

A further object is to provide a mold baking bath which insures the essential close cohesion between resin and filler.

A still further object of our invention is to decrease the time necessary for producing foundry molds and cores, and specifically to decrease the time required for the mold baking operation.

Another object is to eliminate the necessity of reheating the pattern before each new mold forming operation during continuous forming operations.

Still another object is the provision of a simple mechanism for carrying out the mold baking process.

Other objects and advantages will become apparent from the following detailed description in conjunction with the accompanying drawings and from the appended claims. The drawings are not to be taken in a limiting or restrictive sense since it will be apparent to those skilled in the art that various changes in the illustrated construction may be resorted to without in any way exceeding the scope of the invention.

In the drawings:

Fig. 1 is a diagrammatic front elevation of a mold baking apparatus embodying the invention;

Fig. 2 is a side elevation of the apparatus of Fig. 1; and

Fig. 3 is a plan view of the apparatus of Fig. 1 with certain parts omitted for clarity.

The present invention becomes applicable to the production of molds and cores after the uncured mold shell has been formed on the pattern by means of the Croning or some other suitable process. At this point in the production operation the pattern and attached shell are submerged in a bath of molten metal or other liquid in accordance with invention, rather than oven baked as is the current practice.

In the preferred embodiment of the invention the bath liquid is molten Bendaloy, a product of Cerro de Pasco Copper Company of 38 Wall Street, New York 5, New York, consisting of 50% bismuth, 26.7% lead, 13.3% tin and 10% cadmium by weight and now sold under the trademark "Cerrobend." Although Bendaloy, that is Cerrobend, is preferred, sulphur, and a lead-tin-bismuth mixture have been found satisfactory and tests indicate that other low temperature melting point mixtures or alloys will also work satisfactorily. By regulating the depth of submersion the pressure on all parts of the shell may be controlled, the depth being varied slightly in accordance with the density of the bath liquid. When Bendaloy comprises the bath liquid a depth of from 20 to 30 inches has been found most suitable. The preferred pressure has been arrived at by carefully conducted tests and is found to be in the range of 28 to 32 pounds per square inch.

By controlling the temperature of the bath at from 450° F. to 550° F. the most satisfactory baking is achieved in minimum time and the correct heat is maintained in the pattern so that no reheat is necessary prior to positioning the pattern on the mold making machine to form the next shell. A temperature of 500° F., for example, also decreases the viscosity of the bath liquid to such an extent that there is little or no tendency for the bath metal to adhere to the pattern and shell when they are withdrawn.

It will be apparent to those skilled in the art that the pressure exerted by the molten bath upon the shell will force it into close contact with the pattern surface at every point thereof. This pressure effectively corrects any existing, and prevents any new, shell distortions and maintains a perfect tight fit for the 40 seconds consumed by the baking process during which time the shell or mold becomes thoroughly cured and rigid.

Having reference now to the drawings, Figures 1, 2 and 3 schematically illustrate one embodiment of an apparatus adapted to perform the mold baking operation in accordance with the invention. The pattern 10 is permanently attached to its own base 12 which is provided with a handle or extension 14 having a bayonet pin 16 secured in the end thereof. When the uncured shell mold 18 has been formed on the pattern 10, pattern base 12 is attached to an extension 20 of a rack member 22 by means of bayonet pin 16 and a slot 24 in extension 20, or by some other suitable connection.

Rack 22 is slidably mounted for vertical movement in a supporting arm 26 which is rotatably mounted on a base column 28 secured to a suitable standard or bench 30. A pinion shaft 32 is journalled in supporting arm 26 and carries in fixed relation a pinion 34 engaging the teeth 36 of rack 22. Shaft 32 is extended beyond one side of supporting arm 26 as shown in Fig. 2, and a manual turning handle 38 is mounted on the extremity of the extension.

The mold baking bath is located below bench 30 as shown and comprises a receptacle 40 containing the molten metal or other liquid 42 and a suitable heating unit (not shown) to maintain the bath metal at the proper temperature. Molten metal 42 is normally covered by a layer 44 of some inert powder such as fire clay, silica flour, talc or graphite for the purpose of protecting the metal from oxidation and also to coat shell 18 with a thin layer of the powder as the pattern 10 and shell are submerged. The powder coating 44 on the shell serves to prevent the metal from sticking to it, thereby preserving the permeability of the shell and reducing the loss of bath metal.

When a pattern and shell are not attached to the rack 22 the rack is normally in an elevated position and support arm 26 is swung about column 28 so that the rack is not in alignment with bath receptacle 40. In this inoperative position a pawl 46, slidable in a housing 48 mounted on support arm 26, will engage teeth 36 of rack 22 and hold it against upward or downward movement. Pawl 46 is normally urged into rack engaging position by a spring 50. However, when a pattern and shell are attached to the rack extension 20 and support arm 26 is rotated to position them above the bath receptacle 40, a cam 52 mounted on column 28 engages a roller 54 on the pawl 46 and cams the pawl out of rack tooth engagement as shown in Figs. 1 and 3. As best seen from the plan view of Fig. 3 the support arm 26 is rotated in a counterclockwise direction to position the shell above the mold bath and at the same time cause pawl 46 to be disengaged allowing the rack 22 to be lowered and raised by means of handle 38.

An offset arm 56 is secured to the top of rack 22, and when the rack is rotated to a position above the mold bath a contact 58 on the arm 56 is positioned above a roller contact 60 on a timer unit 62 mounted on column 28. As rack 22 is lowered to submerge the pattern and shell in the mold bath contacts 58 and 60 will engage and, through conventional electrical wiring (not shown), activate timer unit 62. The timer 62 is set to relay an impulse after a predetermined length of time through wiring 64 to a bell or buzzer (not shown) to indicate the moment when the baking of the shell is complete. As soon as the signal indicates that the baking has been completed rack 22 is raised and then swung in a clockwise direction (as viewed in Fig. 3) away from the mold bath. Swinging support arm 26 in a clockwise direction causes roller 54 to be disengaged from cam 52 allowing pawl 46 to reengage rack teeth 36. The baked shell and its pattern can then be removed from the rack and replaced with an uncured shell so that the next baking operation can be carried out.

While a manually operated apparatus has been illustrated and described for the purpose of disclosing the invention, it will be understood that conventional automatic means may be employed to swing the support arm 26 and raise and lower rack 22 in response to signals from timer 62.

It will be apparent from the foregoing description that the invention herein provides a novel method of mold baking which produces a mold true to the minutest detail of the pattern and which because of the accuracy of the molds produced results in more perfect castings than have ever heretofore been possible. In addition, the process disclosed takes considerably less baking time than the methods of the current practice, and also eliminates the time-consuming and bothersome step of manually refitting the mold to the pattern that is often necessary before baking by present methods.

The invention may be embodied in other specific forms without departing from the spirit or essential characteristics thereof. The single embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A method of baking an uncured shell mold attached to a pattern and formed of a thermal setting plastic and a refractory filler, said method comprising the steps of submerging said uncured shell mold and pattern in a bath of molten metal which is at least substantially free of the influence of external pressure other than atmospheric pressure, maintaining the mold and pattern in the bath for a period during which said mold is directly subjected to the hydrostatic pressure of said bath sufficient to conform said mold to said pattern and heated to set the plastic thereof, withdrawing the mold and pattern from the bath and removing the resulting baked shell mold from the pattern.

2. A method defined in claim 1 wherein the period of submersion of the uncured shell mold and pattern in the bath is less than one minute.

3. A method of baking an uncured shell mold attached to a pattern and formed of a thermal setting plastic and a refractory filler, said method comprising the steps of submerging said uncured shell mold and pattern in a bath of molten metal which is at least substantially free of the influence of external pressure other than atmospheric pressure, said bath being covered with a layer of inert powder to prevent oxidation of the metal, maintaining the mold and pattern in the bath for a period during which said mold is directly subjected to the hydrostatic pressure of said bath sufficient to conform said mold to said pattern and heated to set the plastic thereof, withdrawing the mold and pattern from the bath, and removing the resulting baked mold from the pattern.

4. A method as defined in claim 3 wherein said inert powder is selected from the group consisting of fire clay powder, silica flour, talc and graphite.

References Cited in the file of this patent

UNITED STATES PATENTS

| | | |
|---|---|---|
| 1,278,206 | Potter | Sept. 10, 1918 |
| 1,377,517 | Novotny | May 10, 1921 |
| 1,595,811 | Anderson | Aug. 10, 1926 |
| 1,719,542 | Gathmann | July 2, 1929 |
| 2,001,658 | Williams | May 14, 1935 |
| 2,150,274 | Gingell | Mar. 14, 1939 |
| 2,197,145 | Engle | Apr. 16, 1940 |
| 2,276,671 | Rentschler et al. | Mar. 17, 1942 |
| 2,351,482 | Campbell | June 13, 1944 |
| 2,367,648 | Nichols | Jan. 16, 1945 |
| 2,416,671 | Almy et al. | Mar. 4, 1947 |
| 2,453,400 | Barnett et al. | Nov. 9, 1948 |
| 2,517,090 | Denning | Aug. 1, 1950 |
| 2,518,040 | Mann | Aug. 8, 1950 |

OTHER REFERENCES

Fiat Final Report 1168, 7 pages, received in library April 8, 1948.

The Foundry, August 1950, pages 206–217.